United States Patent Office 2,910,054
Patented Oct. 27, 1959

2,910,054

ELECTRONIC FUEL INJECTION CONTROL SYSTEM

Otto Schütte, Darmstadt, Germany, assignor to Robert Bosch G.m.b.H., Stuttgart, Germany Application April 30, 1958, Serial No. 732,088

Claims priority, application Germany May 5, 1957

19 Claims. (Cl. 123—32)

The present invention relates to fuel injection control systems for combustion devices, in particular internal combustion engines of automotive vehicles, and has for its main object to control and/or maintain a desirable fuel-air ratio under varying operating conditions and/or requirements.

As is well known, in the operation of an internal combustion engine, it is highly desirable to maintain a correctly determined (stoichiometric) fuel-air ratio and to vary such ratio over a given range of operating conditions of the engine, in an effort to obtain optimum operating efficiency and fuel economy. For example, in the case of an automotive vehicle, it is desirable to maintain the fuel-air ratio substantially constant under normal operating conditions and to enrich such ratio when maximum power is required, such as during acceleration, and, conversely, to reduce the fuel-air ratio when cruising over long distances, to obtain maximum fuel economy. Other operating conditions or parameters affecting the fuel-air ratio are the operating speed of the vehicle, throttle opening, the engine or coolant temperature, atmospheric pressure and air temperature.

Accordingly, an important object of the present invention is the provision of an improved electronic fuel-air ratio control system for injection type combustion devices, in particular for the internal combustion engines of automotive vehicles, whereby a desirable fuel-air ratio may be maintained over a substantial range of varying operating conditions and requirements, to insure maximum operating efficiency as well as fuel economy.

A more specific object of the invention is the provision of an electronic control system for fuel injection type combustion devices, in particular for the internal combustion engines of automotive vehicles, to automatically maintain a desired fuel-air ratio in dependence upon and over a wide range of operating conditions and/or requirements.

Yet another object of the invention is the provision of a control system of the above type being instantaneously responsive to a plurality of varying operating conditions and/or requirements affecting the fuel-air ratio in both arithmetic and geometric relationship.

The invention, as to its ancillary objects as well as novel aspects, will be better understood from the following detailed description, taken in reference to the accompanying drawings forming part of this specification and wherein.

Figure 1:
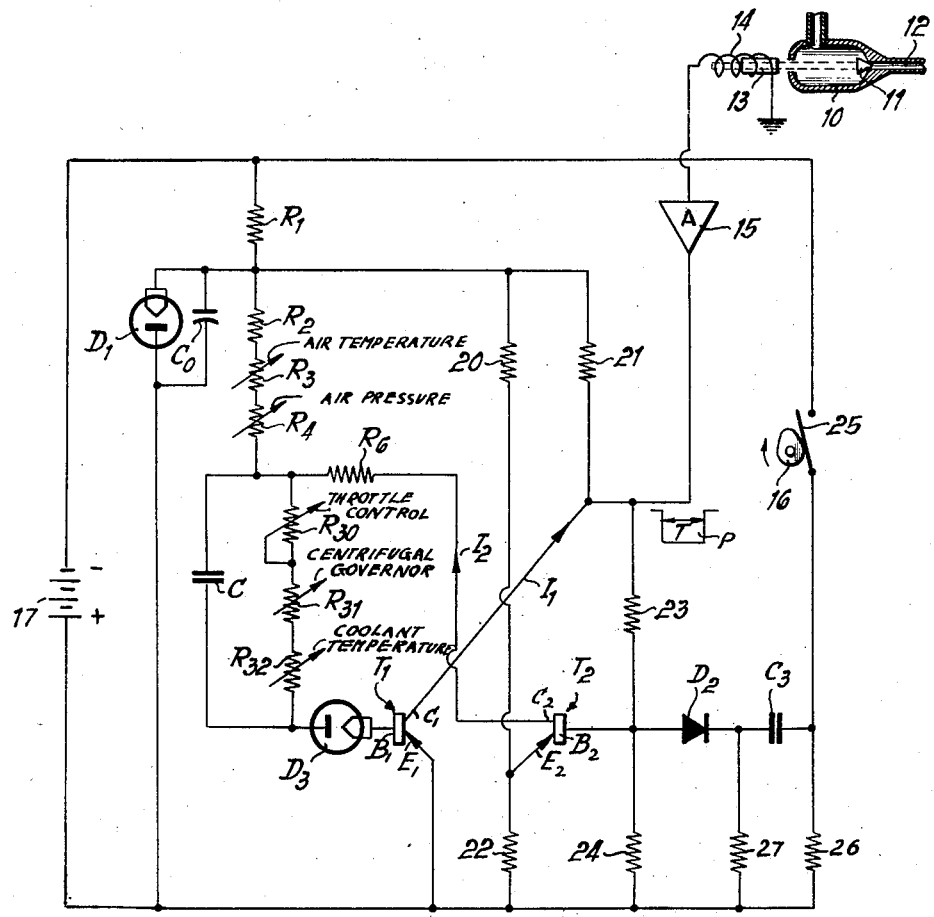
Fig. 1 is a schematic view and circuit diagram of an electronic fuel injection control system embodying the principles of the invention.

With the foregoing objects in view, the invention involves generally the utilization of an electronic pulse former, preferably in the form of a mono-stable or "one shot" multivibrator circuit comprising an R-C or timing circuit or network whose parameters and/or operating potential are determinative of the length or duration of a series of output current control pulses produced by the application of a series of input or triggering pulses applied to said circuit, in a manner well known and understood. Said triggering pulses are synchronized with the engine cam shaft, in the case of an internal combustion engine, and the output current pulses of the pulse former utilized to energize a solenoid or equivalent electrical actuating device adapted to open the fuel injection valve of the engine, to introduce a predetermined quantity of a fuel under constant pressure into the engine combustion chamber, as determined by the length or duration of the pulses of the multivibrator or equivalent pulse former device. By varying the time constant of the R-C circuit and/or the operating potential impressed upon said circuit at the instant of application of triggering pulse to the circuit, the pulse duration and, in turn, the fuel injection time may be controlled accordingly, in such a manner as to result in a corresponding variation of the fuel-air ratio.

In order to obtain an automatic control of the fuel-air ratio in dependence upon varying operating conditions and/or requirements, the resistance of the R-C circuit may be composed of a plurality of variable sensing resistors arranged or adapted to be varied in dependence upon the changing operating conditions of the engine or parameters affecting the fuel-air ratio, such as throttle opening, coolant temperature and operating speed, all of which affect or control the fuel-air ratio in additive or arithmetic relation. Alternatively, variations of operating conditions or parameters affecting the fuel-air ratio in multiplicative or geometric relation, may be considered by a control of the operating potential impressed to the R-C circuit at the instant of application of a triggering pulse, in a manner more clearly described in and understood from the following.

The invention is especially suited for use of semi-conductive or transistor amplifiers for the pulse former or multivibrator circuit, on account of their small size and bulk, their low power consumption or drain on the battery of a motor vehicle, as well as their durability, shock resistance and other desirable characteristics well known. It will be understood, however, that other equivalent amplifying or translating devices may be used for the purposes of the invention, without affecting the basic operation and results obtained.

In order to obtain an ideal fuel-air mixture, it is necessary that the amount of injected fuel be related to the quantity of incoming air according to a predetermined ratio, known as the stoichiometric ratio, which is about 14 to 16 kg. of air for each kg. of fuel for gasoline, about 13 kg. of air or benzene and about 9 kg. of air for ethyl alcohol per each kg. of fuel. It is difficult to determine the amount of the incoming air on account of its dependence mainly upon five factors or conditions, viz. the throttle opening and speed of revolution of the internal combustion engine, the temperature of the cooling medium, as well as the ambient temperature and atmospheric pressure or altitude above sea level. There may also be a certain relation to air moisture content.

Variation of the air temperature may occur within a range of from $-20°$ to $+80°$ C. Its effect upon the amount of the air sucked in by the engine is approximately inversely proportional to the square root of the absolute temperature. Experiments have shown that the amount of the injected fuel must be varied by about 2.5% for each change of 10° of the air temperature.

In order to safely operate the motor at coolant temperatures below the normal operating temperature of from 80° to 90° C., it is necessary to progressively enrich the fuel-air mixture as the coolant temperature decreases. Experiments have shown that, within a range of variation of from —20° to +60° of the coolant temperature, the amount of injected fuel must be increased during each operating cycle by about 2.5 mm.³ for each temperature decrease of 10°. Moreover, the required change of the injected fuel for a change of the atmospheric pressure by 100 mm. Hg amounts to about 7%.

By the present invention the required control of the injected fuel is effected by means of electrical sensing or control signals applied to a mono-stable multivibrator or the like pulse former, in such a manner as to vary the pulse length and, in turn, the fuel injection time both additively and multiplicatively in dependence upon varying engine operating conditions and requirements. Thus, the effect of the throttle opening, of the engine speed and the coolant temperature upon the injection time should be additive, while the effect of the air temperature and pressure should be multiplicative in affecting the pulse duration or fuel injection time.

A preferred embodiment of the foregoing object is obtained, according to the invention, by the utilization of a pulse former or multivibrator including a timing circuit or network including a resistance varied in dependence upon the throttle opening, the engine speed and coolant temperature, said circuit having impressed thereon an operating potential being varied in dependence upon other operating conditions multiplicatively affecting the fuel-air ratio, such as air temperature and atmospheric pressure. This potential control of the timing circuit may be effected by means of a potentiometer or voltage divider, or, alternatively, by the provision of suitable voltage generators controlled in accordance with the respective operating conditions or control parameters.

According to the preferred embodiment of the invention, as shown by the drawings, there are connected across the capacitor of the timing circuit a series of variable sensing resistors arranged to be varied or controlled in dependence upon the throttle opening, the engine speed and the coolant temperature, respectively, while at the same time a voltage divider or potentiometer serves to apply a varying operating potential to said circuit controlled in dependence upon the atmospheric pressure and temperature of the air entering the combustion chamber of the engine.

Referring more particularly to Fig. 1 of the drawings, the fuel injection system shown may comprise a number of injection valves or nozzles, one of which has been shown at 10 in the drawing. Each of the injection valves is connected to a fuel pump, to maintain a fuel under constant pressure within the valve chambers, as long as the valve cone 11 engages the discharge or injection opening 12. The valve cone 11 may be disengaged from its seat by the spring-biased iron core 13 of an electromagnet or solenoid having an exciting winding 14 connected in the output circuit of a power amplifier 15.

The starting and duration of the fuel injection by the electromagnetic valve 10 is governed by a control device comprising a mono-stable or "one shot" multivibrator circuit constituting a pulse former and comprising, in the example shown, a pair of PNP transistors $T_1$ and $T_2$ operated in grounded or common emitter configuration, one each of said transistors having an emitter $E_1$, $E_2$, a base $B_1$, $B_2$ and a collector $C_1$, $C_2$, respectively. In the normal or stable condition of the circuit, the transistor $T_2$ is substantially non-conductive, while the transistor $T_1$ passes its full output current. To this condition the transistors will be returned automatically, upon forcibly establishing a reverse condition, that is, with the transistor $T_1$ being blocked and the transistor $T_2$ being conductive, by the application of a temporary control potential upon the base of the transistor $T_2$ in synchronism with the engine and being controlled, for instance, by a contact 25 cooperating with a cam 16 mounted upon the cam shaft of the engine.

More specifically, in the circuit shown the base electrode $B_1$ of the transistor $T_1$ is connected to a capacitor C of about 0.15μ, said capacitor being shunted by a series combination of three variable sensing resistors $R_{30}$, $R_{31}$ and $R_{32}$, of which resistor $R_{32}$ is connected directly to one electrode of the capacitor C, on the one hand, and indirectly to the base $B_1$ of transistor $T_1$ by way of a diode $D_3$, on the other hand, while the resistor $R_{30}$ is connected to the remaining electrode of the capacitor. Further connected to the latter electrode is a resistor $R_6$, on the one hand, whose remaining end is led to the collector $C_2$ of the transistor $T_2$, and a further series combination comprising a pair of fixed resistors $R_1$ of about 500 ohms and $R_2$ of about 5000 ohms followed by a pair of further variable sensing resistors $R_3$ and $R_4$, on the other hand. Connected to the junction point between the fixed resistors $R_1$ and $R_2$ is a voltage limiter circuit comprising a reversely-biased diode $D_1$ shunted by a capacitor $C_0$, the remaining end of the resistor $R_1$ being connected to the minus pole of a voltage source 17, such as the battery of a motor vehicle. The limiting circuit $C_0$–$D_1$ is not essential for the operation of the invention and will not be referred to further in the following.

Further connected to the junction point between resistors $R_1$ and $R_2$ are a pair of further fixed resistors 20 and 21 of 5000 ohms each. Resistor 20 is connected to the emitter $E_2$ of the transistor $C_2$, emitter $E_2$ being, in turn, connected to the positive pole of the source 17 through a further resistor 22 of about 500 ohms. The remaining end of the fixed resistor 21 is connected to the collector $C_1$ of the transistor $T_1$ whose emitter $E_1$ is directly connected to the plus pole of the source 17. Furthermore, the collector $C_1$ of the transistor $T_1$ is connected to the input of the power amplifier 15, on the one hand, and to the base $B_2$ of the transistor $T_2$ through a further fixed resistor 23, on the other hand, said base being, in turn, connected to the plus pole of the source 17 through a fixed resistor 24 of about 500 ohms, to provide proper operating bias for the base electrode $B_2$ in the stable or rest position of the circuit.

The resistors 20 and 22 form one of the main branches of a bridge circuit whose other branch is formed by the resistors 21, 23 and the resistor 24. The values of the bridge resistors are such that, in the rest or stable condition of the circuit, the potential of the base $B_2$ of transistor $T_2$, whose input or control circuit is in series with one of the diagonal branches of a bridge, is equal or somewhat higher than the potential of the emitter $E_2$, whereby to block transistor $T_2$ in the normal condition shown in the drawing.

The sensing resistors $R_{30}$, $R_{31}$ and $R_{32}$ form a timing circuit in conjunction with the capacitor C whose discharge time constant is proportional to the adjusting values of the resistors. According to the example illustrated, the resistor $R_{30}$ may be controlled in dependence upon the position of the throttle valve arranged in the air intake duct of the combustion engine by the provision of suitable coupling or linkage means (not shown), while the resistor $R_{31}$ may be controlled by a centrifugal governor responsive to the engine speed. Finally, the third variable sensing or series resistor $R_{32}$ of the discharge circuit of the capacitor C may be in the form of a heat responsive resistance element (thermistor) immersed in the cooling medium of the engine and designed to present a low resistance for high coolant temperatures and to present a high resistance for low coolant temperatures, respectively. As will be further explained in the description of the operation of the invention, the effect of the sensing resistors $R_{30}$, $R_{31}$ and $R_{32}$ upon the injection time or amount of injected fuel will be in additive or arithmetic relation.

On the other hand, variations of the sensing resistors $R_3$ and $R_4$ upon the pulse duration or fuel injection time will be in multiplicative or geometric relation, as will become further apparent from the following. More specifically, the sensing resistor $R_3$ may be a heat-sensitive resistance element (thermistor) arranged in the air intake duct of the engine and designed to present a low resistance for high incoming air temperatures, and vice versa. The sensing resistor $R_4$ may be in the form of a rotary resistance element having a variable contact controlled by the diaphragm of a barometric pressure gauge subject to ambient air or atmospheric pressure.

The operation of the system shown in Fig. 1 will now be described in the following. As long as the cam 16 or equivalent triggering device is in the position shown, that is, with the switch arm or contact 25 in its open position, the potential of the base $B_2$ of the transistor $T_2$ will be determined by the collector current $I_1$ of the transistor $T_1$ being directly coupled with the resistor $T_2$ and practically providing a short-circuit across the bridge resistors 23 and 24. Resistor 22 in the emitter circuit of transistor $T_2$ is of a sufficiently high value to cause the potential of the emitter $E_2$ to be lower than the potential of the base $B_2$, whereby the transistor is blocked or biased to collector current cut-off, in the manner pointed out.

Upon closing of the switch arm 25 by the cam 16, the base $B_2$ is biased to the full negative potential of the source or battery 17 by way of the diode $D_2$ and coupling capacitor $C_3$, thus rendering transistor $T_2$ highly conductive. As a result, a collector current $I_2$ is caused to flow through the voltage divider resistors $R_2$, $R_3$ and $R_4$, whereby to produce a voltage drop and causing the potential of the base $B_1$ of the transistor $T_1$ to become more positive than its emitter potential, on account of the previous charging of the capacitor C to practically the full operating potential of the source 17. This, in turn, causes a blocking of the transistor $T_1$ resulting in interruptin of the output current $I_1$ and cessation of the voltage drop across resistor 21. As a result, the base $B_2$ of transistor $T_2$ becomes more negative, whereby to maintain it at a negative potential relative to the emitter $E_2$ and causing the transistor to remain in conductive condition even after cessation or removal of the triggering pulse upon opening of the switch or contact 25.

Only after the capacitor C has been sufficiently discharged to cause the voltage between the base $B_1$ and emitter $E_1$ of transistor $T_1$ to decrease below zero, whereby rendering the transistor again conductive and re-establishing the voltage drop by the current $I_1$ across resistor 21, will the transistor $T_2$ return to its normal or blocked condition in which it will remain until the next application of a triggering pulse by the switch or contact 25.

Accordingly, there will be set up in the input circuit of the power amplifier 15 a series of rectangular or square wave current pulses P in response to the triggering pulses applied to the transistor $T_2$, the width or duration T of the pulses corresponding to the time period elapsed from the instant of closing of the contact 25 to the instant when the capacitor C has been discharged to a potential to cause the voltage between the base $B_1$ and emitter $E_1$ of transistor to decrease below zero.

As a result, the width or duration T of the pulses P and, in turn, the amount of fuel injected under constant pressure into the combustion chamber of the engine, are dependent upon the time constant of the discharge or timing circuit comprised of the capacitor C and the sensing resistors $R_{30}$, $R_{31}$ and $R_{32}$, on the one hand, as well as upon the potential impressed upon said circuit by the output current $I_2$ of the resistor $T_2$ at the initiation of a triggering pulse or closing of the contact 25. Variations of the resistor $R_{30}$ coupled with the throttle or accelerator control, of the resistor $R_{31}$ coupled with the centrifugal governor and of the resistor $R_{32}$ varying in proportion to the coolant temperature, are additive in their effect upon the pulse width or injection time T, while changes of the resistor $R_3$ varying in dependence upon the atmospheric pressure will exert a multiplicative effect upon the pulse width or injection time by varying the potential impressed upon the timing circuit $C$–$R_{30}$, $R_{31}$, $R_{32}$ at the instant of closing of the contact 25 or initiation of the discharge of the capacitor C.

While PNP transistors have been shown in the drawing, transistors of the NPN type may be used without materially affecting the function and operation of the invention, the only change necessary being a reversal of all the operating potentials or polarities, in a manner readily understood by those skilled in the art.

Figure 2:
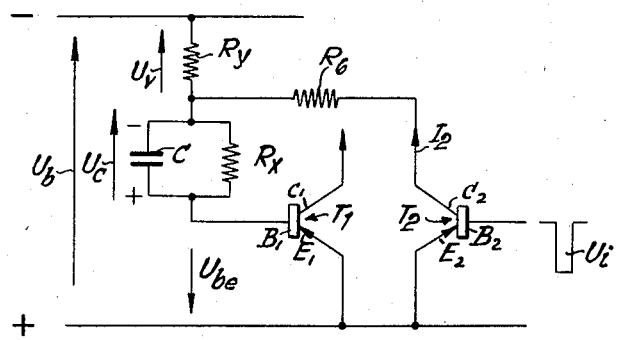
Fig. 2 is a simplified diagram of Fig. 1, affording a better understanding of the function and operation of the invention.

The multiplicative effect of resistors $R_3$ and $R_4$ in the output circuit of transistor $T_2$, on the one hand, and the additive effect of resistors $R_{30}$, $R_{31}$ and $R_{32}$ forming effective elements of the timing circuit, on the other hand, upon the pulse width or fuel injection time T will be further understood by reference to the simplified diagram of Fig. 2, showing only the essential elements of Fig. 1 and described in detail in the following.

In Fig. 2, the two transistors of the multivibrator circuit are again shown at $T_1$ and $T_2$. Sensing resistor $R_3$ varying in dependence upon the air temperature and sensing resistor $R_4$ varying in dependence upon the atmospheric pressure have been combined, together with the fixed resistor $R_2$, into a single resistor $R_y$ variable within a certain range and forming together with the resistor $R_6$ a voltage divider in the output circuit of the transistor $T_2$ to which are connected the base $B_1$ of transistor $T_1$ as well as the timing circuit comprised of the capacitor C and shunt resistor $R_x$, the latter comprising the sensing resistors $R_{30}$, $R_{31}$ and $R_{32}$ of Fig. 1, that is $$R_y = R_2 + R_3 + R_4$$

and $$R_x = R_{30} + R_{31} + R_{32}$$

According to a practical example, $R_x$ may be about 100,00 ohms and $R_y$ of the order of 5000 ohms.

Let it now be assumed that the contact 25, Fig. 1, is in its open position, that is, that the transistor $T_1$ is carrying full current and transistor $T_2$ is blocked, corresponding to the stable or rest condition of the system.

In this case, the voltage divider comprised of resistors $R_y$ and $R_6$ is ineffective due to the absence of a current $I_2$ resulting in the absence of any voltage drop across said resistors. As a result, the capacitor C of the timing circuit will be charged to a maximum voltage $U_c$ which for all practical purposes will be equal to the operating voltage $U_b$ of the source or battery 17, Fig. 1, due to the fact that the resistor $R_y$ is small compared with the resistor $R_x$. The charging voltage of the capacitor is therefore:

$$U_{c\ max} = U_b \qquad (1)$$

If now the transistor $T_2$, upon closing of contact 25, receives a triggering pulse $U_t$ and, as a result, passes a strong output current $I_2$ through resistor $R_6$ (about 6000 ohms), the voltage divider comprised of resistors $R_y$ and $R_6$ will become effective by causing a voltage drop $U_v$ across resistor $R_y$ determining both the operating potential impressed upon the timing circuit $C$–$R_x$ as well as upon the base $B_1$ of transistor $T_1$. As a result, the effective voltage $U_{be}$ between the base and emitter of transistor $T_1$ will be determined by the following equation:

$$U_{be} + U_b - U_v - U_c = 0 \qquad (2)$$

The voltage drop $U_v$ is, in turn, determined as follows:

$$U_v = U_b \frac{R_y}{R_6 + R_y} = U_b \alpha \qquad (3)$$

wherein $$\alpha = \frac{R_y}{R_6 + R_y}$$

During the discharge of the capacitor C, the initial charging voltage $U_{c\,max} = U_b$ existing at the time $t_0$ decreases exponentially to a value $U_c$ at the time $t$, as shown in Fig. 5, and according to the formula:

$$U_c = U_{be} - t/\tau \qquad (4)$$

wherein $\tau = R_c \cdot C$ represents the time constant of the circuit.

Let it be further assumed that, at the instant or after lapse of time $t = T$, the circuit returns to its rest or stable condition, that is, with transistor $T_1$ becoming again conducting and transistor $T_2$ becoming blocked. This will be possible only if the capacitor has been sufficiently discharged at the time T to cause $U_{be}$ to become zero, as will be readily understood.

Figure 3:
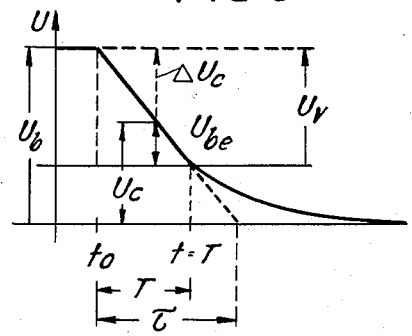
Fig. 3 is a graph further explanatory of the function of invention.

As will be seen from Fig. 3, the voltage decrease $\Delta U_c$ of the capacitor may be assumed with sufficient approximation to follow a straight line during the time period T, that is $$\Delta U_c = U_b \frac{T}{\tau} \qquad (5)$$

Since $$U_c = U_b - \Delta U_c = U_b - U_b \frac{T}{\tau}$$

and $U_{be} = 0$, according to the above, it follows from Equation 2 that $$U_{be} + U_b - U_v - U_c = U_b - U_v - \left(U_b - U_b \frac{T}{\tau}\right) = 0$$

or $$U_v = U_b \frac{T}{\tau} \qquad (6)$$

Combining (6) with (3) results in $$U_b - \frac{T}{\tau} = U_b$$

that is $$\frac{T}{\tau} = \alpha \qquad (7)$$

Since $\tau = R_x \cdot C$, it follows that $$T = R_x \cdot C \cdot \alpha \qquad (8)$$

Replacing the values of $R_x$ and $R_y$, it follows that $$T = C(R_{30} + R_{31} + R_{32}) \cdot \frac{R_2 + R_3 + R_4}{R_2 + R_3 + R_4 + R_6}$$

From the foregoing, it is seen that the variations of the resistors $R_{30}$, $R_{31}$ and $R_{32}$ exert an additive effect upon the pulse width or fuel injection time T, while variations of resistors $R_3$ and $R_4$ produce a multiplicative effect or result.

The rectifiers $D_2$ and $D_3$ which may be in the form of semi-conductive or junction diodes, are provided for the purpose of reducing the effect of the temperature upon the transistors if the latter are of the germanium type. In this case, it is desirable to use silicon diodes. On the other hand, if silicon transistors are used, the additional diodes may be dispensed with.

Figure 4:
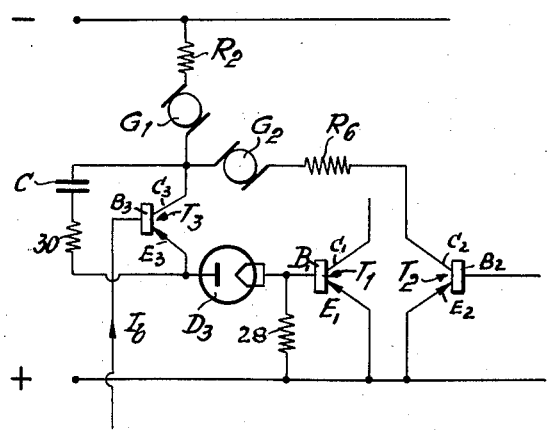
Fig. 4 is a simplified diagram illustrating a modification of the control system shown by Fig. 1. Like reference characters denote like parts in the different views of the drawings.

According to the embodiment of the invention shown by Fig. 4, the base lead of the transistor $T_1$ again includes a silicon diode $D_3$, while the shape of the current pulses is improved by the provision of a leak resistor 28 of about 100,000 ohms connected to the junction between the base $B_2$ and the diode $D_3$. In place of the resistor $R_x$ of Fig. 2, there is provided according to this modification a third transistor $T_3$ whose emitter-collector path $E_3$–$C_3$ acts as a variable discharge resistance for the timing circuit capacitor C controlled by the varying base current $I_b$ of the transistor $I_3$. As an example, the control current may be supplied by a thermocouple immersed in the coolant medium of the engine, to control the time constant of the timing circuit comprised of the capacitor C and the transistor $T_3$ and to thereby effect a control of the fuel-air ratio, in the manner described and understood from the foregoing. Advantageously, a further resistor 30 may be connected in series with the capacitor C, to provide a voltage drop sufficient to enable ready starting of the pulses or oscillations. The use of a transistor as a discharging resistance for the timing circuit capacitor according to Fig. 4 has the advantage that the discharge current practically has a constant value, whereby to cause the discharge curve to follow approximately a straight line.

Moreover, in the embodiment according to Fig. 4, the initial potential of the timing circuit comprised of the capacitor C, transistor $T_3$ and resistor 30 is controlled by means of suitable voltage generators $G_1$ and $G_2$ replacing the potentiometers resistors $R_3$ and $R_4$ of Fig. 1 and being connected in the output circuit of transistor $T_2$ in series with the fixed voltage divider resistors $R_2$ and $R_6$. Generators $G_1$ and $G_2$ serve to apply voltages varying according to the engine operating conditions, such as air temperature, air pressure, etc. As an example, the generated voltage may be controlled by a compression resistor connected in series with the field winding of a generator and arranged to be actuated by a pressure gauge, bi-metallic thermometer or any equivalent sensing device, in a manner readily understood. It is further possible to include in the control of the fuel-air ratio other operating conditions or parameters separately or in addition to those herein shown and described, such as the octane number of the fuel being used.

In the foregoing, the invention has been described with reference to a specific illustrative device. It will be evident, however, that variations and modifications, as well as the substitution of equivalent parts and elements for those shown and disclosed herein for illustration, may be made without departing from the broader scope and spirit of the invention as set forth in the appended claims.

The specification and drawings are accordingly to be regarded in an illustrative rather than in a restrictive sense.

I claim:

1. In a fuel injection system for a combustion device of the type including injection valve means to supply a fuel under pressure to said device, control means comprising actuating means adapted to open said valve means by and for the duration of an electric current pulse applied thereto, monostable pulse forming means comprising a first amplifier, a second amplifier, load resistance means for each said amplifiers, direct coupling means between the output of said first amplifier and the input of said second amplifier, a resistance-capacity coupling network between the output of said second amplifier and the input of said first amplifier, to normally pass an output current through said first amplifier and to normally bias said second amplifier to output current cut-off, whereby to render said first amplifier temporarily non-conductive during a period determined by the time constant of said network upon the application of a triggering pulse to said second amplifier, to produce output current pulses of said first amplifier, means to energize said actuating means by said output current pulses, and further means to vary the time constant of said network, whereby to control the fuel injection time of said valve means.

2. In a fuel injection system as claimed in claim 1, including means to control said last-mentioned means in dependence upon at least one varying operating condition of said device affecting the fuel-air ratio in the combustion chamber thereof, to substantially maintain the fuel-air ratio of a predetermined value.

3. In a fuel injection system as claimed in claim 1 for use in the internal combustion engine of an automotive vehicle, including triggering pulse generating means for said second amplifier synchronized with said engine, and means to control the resistance of said network in dependence upon at least one operating condition of said engine affecting the fuel-air ratio in the combustion chamber thereof, whereby to substantially maintain said fuel-air ratio at a constant value within a predetermined range of variation of the engine operating conditions.

4. In a fuel injection system as claimed in claim 1 for use in the internal combustion engine of an automotive vehicle, including triggering pulse generating means for said second amplifier synchronized with said engine, said network being comprised of a resistance shunted by a capacity and said resistance comprising a series of variable sensing resistors each arranged to be controlled in dependence upon a different varying operating condition of said engine affecting the fuel-air ratio in the combustion chamber thereof, to substantially maintain said fuel-air ratio at a constant value within a predetermined range of variation of the engine operating conditions.

5. In a fuel injection system as claimed in claim 1 for use in the internal combustion engine of an automotive vehicle, including triggering pulse generating means for said second amplifier synchronized with said engine, said network being comprised of a resistance shunted by a capacity and said resistance comprising a series of variable sensing resistors arranged to be controlled in dependence upon the speed, the throttle opening and the coolant temperature, respectively, of said engine, whereby to substantially maintain a predetermined fuel-air ratio in the combustion chamber of said engine.

6. In a fuel injection system as claimed in claim 5, wherein said amplifiers are comprised of a first and a second junction transistor each having an emitter, a base and a collector, load resistance means connected in the collector circuit of each said transistors, said network being comprised of a resistance shunted by a capacity and connected between the base of said first transistor and a point of the load resistance means of said second transistor.

7. In a fuel injection system as claimed in claim 6, including further means to vary said last-mentioned resistance in dependence upon at least one varying operating condition of said engine being geometrically related to said fuel-air ratio.

8. In a fuel injection system as claimed in claim 6, wherein said last-mentioned load resistance means includes a pair of series resistors arranged to be controlled in dependence upon the incoming air pressure and air temperature, respectively in said combustion chamber.

9. In a fuel injection system for an internal combustion engine of the type including fuel injection valve means, to supply a fuel under pressure to said engine, control means comprising actuating means adapted to open said valve means by and for the duration of a control current pulse applied thereto, a monostable pulse former comprising a first amplifier, a second amplifier, load resistance means for each said amplifiers, direct coupling means between the output of said first amplifier and the input of said second amplifier, and a coupling network comprised of a capacity shunted by a resistance and connected between the output of said second amplifier and the input of said first amplifier, to normally pass an output current through said first amplifier and to normally bias said second amplifier to output current cut-off, whereby to temporarily render said first amplifier non-conductive during a period determined by the time constant of and the operating potential impressed upon said network upon the application of a triggering voltage pulse to the input of one of said amplifiers, to produce output current pulses of said first amplifier, means to energize said actuating means by said output pulses, to control the fuel injection time by said valve means, further means to produce a series of triggering pulses for said second amplifier synchronized with said engine, and means to vary the resistance of said network in dependence upon at least one varying operating condition of said engine being arithmetically related to the fuel-air ratio and to control the operating potential impressed upon said network in response to at least one varying operating condition geometrically related to said fuel-air ratio in the combustion chamber of said engine, thereby to maintain a substantially constant fuel-air ratio within a predetermined operating range of said engine.

10. In a fuel injection system as claimed in claim 9 for use in automotive vehicles, wherein said resistance is comprised of a series of variable sensing resistors arranged for control by the speed, throttle opening and coolant temperature, respectively, of said engine and wherein said load resistance means of said first amplifier includes a pair of variable series resistors arranged for control by the incoming air pressure and air temperature, respectively.

11. In a fuel injection system as claimed in claim 9 for use in automotive vehicles, wherein said resistance is comprised of a series of variable sensing resistors arranged for control in dependence upon the speed, throttle opening and coolant temperature, respectively of said engine and wherein the load resistance means of said second amplifier includes at least one variable sensing resistor arranged to be controlled in dependence upon a varying operating condition of said engine being geometrically related to said fuel-air ratio.

12. In a fuel injection system as claimed in claim 9 for use in automotive vehicles, wherein said resistance is comprised of a series of variable sensing resistors arranged for control in dependence upon the speed, throttle opening and coolant temperature, respectively, of said engine, and at least one voltage generator controlled in dependence upon a varying operating condition of said engine being geometrically related to the fuel-air ratio and connected in the output circuit of said second amplifier.

13. In a fuel injection system for internal combustion engines of the type including injection valve means to supply a fuel under pressure to said engine, control means comprising electromagnetic actuating means to open and control said valve means by and for the duration of an electric current pulse applied thereto, a monostable pulse former comprising a first transistor and a second transistor, each said transistors having an emitter, a base and a collector, load resistance means in series with the emitter-collector paths of each said transistors, direct coupling means between the collector of said first transistor and the base of said second transistor, a coupling network comprised of a capacity shunted by a resistance and connected between a point of the collector circuit of said second transistor and the base of said first transistor, to normally pass a collector output current through said first transistor and to normally bias said second transistor to collector current cut-off, whereby to temporarily interrupt the output current of said first transistor during a period determined by the time constant of and the operating potential impressed upon said network upon application of a triggering pulse voltage to the base of one of said transistors, to produce output current pulses of said first transistor, means to energize said actuating means by said output current pulses, to control the fuel injection time of said valve means, further means to produce a series of triggering pulses for said second transistor synchronized with said engine, and means to control said resistance in dependence upon at least one varying operating condition of said engine being arithmetically related to the fuel-air ratio in the combustion chamber thereof and to control said operating potential in dependence upon at least one varying operating condition of said engine being geometrically related to said fuel-air ratio, thereby to substantially maintain a constant fuel-air ratio within a predetermined operating range of said engine.

14. In a fuel injection system as claimed in claim 13, wherein said transistors are of the germanium junction type, and a diode connected in series with the base of each said transistors.

15. In a fuel injection system as claimed in claim 13 for use in automotive vehicles, wherein said resistance is comprised of a series of variable sensing resistors arranged for control in proportion to the speed, throttle opening and coolant temperature, respectively, of said engine.

16. In a fuel injection system as claimed in claim 13 for use in automotive vehicles, wherein said resistance is comprised of a further transistor having its emitter-collector path shunted across said capacity, and means to vary the base current of said further transistor in dependence upon at least one varying operating condition of said engine being arithmetically related to said fuel-air ratio.

17. In a fuel injection system as claimed in claim 13, wherein the load resistance means of said second transistor includes at least one variable series resistor arranged to be controlled in dependence upon a varying operating condition of said engine being geometrically related to said fuel-air ratio.

18. In a fuel injection system as claimed in claim 13 for use in automotive vehicles, including at least one voltage generator producing a voltage varying in proportion to an operating condition being geometrically related to the fuel-air ratio and connected in the collector circuit of said second transistor.

19. In a fuel injection system for an internal combustion engine of the type including injection valve means to supply a fuel under pressure to said engine, control means comprising actuating means adapted to open said valve means by and for the duration of an electric current pulse applied thereto, a pulse former to control said actuating means of the type including a resistance-capacity timing network and means to produce an output current pulse of a length determined by the time constant of and operating potential impressed upon said network in response to triggering pulse applied to said pulse former, triggering pulse generating means synchronized with said engine, to produce a series of output current pulses energizing said actuating means, and means to vary the time constant of said network in dependence upon at least one varying operating condition of said engine being arithmetically related to the fuel-air ratio in the combustion chamber thereof and to vary the operating potential of said network in dependence upon at least one further operating condition of said engine being geometrically related to said fuel-air ratio, to control the fuel injection time whereby to maintain a substantially constant fuel-air ratio within a predetermined operating range of said engine.

References Cited in the file of this patent

UNITED STATES PATENTS 2,815,009   Pribble _____ Dec. 3, 1957

Notice of Adverse Decision in Interference

In Interference No. 91,758 involving Patent No. 2,910,054, O. Schütte, Electronic fuel injection control system, final judgment adverse to the patentee was rendered Mar. 28, 1962, as to claims 1 through 4.

[*Official Gazette May 15, 1962.*]